(12) United States Patent
Videlov et al.

(10) Patent No.: US 8,997,193 B2
(45) Date of Patent: Mar. 31, 2015

(54) SINGLE SIGN-ON FOR DISPARATE SERVERS

(75) Inventors: Vladimir Videlov, Schwetzingen (DE); Dimitar Mihaylov, Sofia (BG)

(73) Assignee: SAP SE, Walldorf (DE)

( * ) Notice: Subject to any disclaimer, the term of this patent is extended or adjusted under 35 U.S.C. 154(b) by 14 days.

(21) Appl. No.: 13/470,602

(22) Filed: May 14, 2012

(65) Prior Publication Data

US 2013/0305334 A1  Nov. 14, 2013

(51) Int. Cl.
  *G06F 21/00* (2013.01)
  *H04L 9/32* (2006.01)
  *G06F 21/41* (2013.01)

(52) U.S. Cl.
  CPC ............... *G06F 21/00* (2013.01); *G06F 21/41* (2013.01)
  USPC .................................... 726/7; 726/6; 713/168

(58) Field of Classification Search
  CPC ... H04L 9/32; H04L 63/0407; H04L 63/0815; H04L 29/06768; H04L 2463/081; H04L 63/08; H04L 67/04; H04L 67/16; G06F 2221/2215; G06F 21/00; G06F 21/41
  USPC ...................... 705/80; 726/3, 5, 7, 8
  See application file for complete search history.

(56) References Cited

U.S. PATENT DOCUMENTS

| | | | | |
|---|---|---|---|---|
| 6,178,511 | B1 * | 1/2001 | Cohen et al. ....................... | 726/6 |
| 7,191,467 | B1 * | 3/2007 | Dujari et al. ...................... | 726/5 |
| 7,783,765 | B2 * | 8/2010 | Hildebrand et al. .......... | 709/229 |
| 8,255,984 | B1 * | 8/2012 | Ghostine et al. .................. | 726/8 |
| 2002/0087858 | A1 * | 7/2002 | Oliver et al. ................... | 713/156 |
| 2003/0033535 | A1 * | 2/2003 | Fisher et al. ................... | 713/185 |
| 2003/0048909 | A1 * | 3/2003 | MacKenzie et al. .......... | 380/278 |
| 2003/0158949 | A1 * | 8/2003 | Miller et al. ................... | 709/229 |
| 2003/0236975 | A1 * | 12/2003 | Birk et al. ...................... | 713/156 |
| 2005/0074126 | A1 * | 4/2005 | Stanko .......................... | 380/279 |
| 2005/0120214 | A1 * | 6/2005 | Yeates et al. ................... | 713/171 |
| 2005/0289640 | A1 * | 12/2005 | Tanaka et al. ..................... | 726/3 |
| 2006/0155981 | A1 * | 7/2006 | Mizutani et al. .............. | 713/150 |
| 2006/0236385 | A1 * | 10/2006 | Innes et al. ...................... | 726/10 |
| 2007/0115876 | A1 * | 5/2007 | Doshi .......................... | 370/329 |
| 2007/0136586 | A1 * | 6/2007 | Barrett ......................... | 713/168 |
| 2007/0186106 | A1 * | 8/2007 | Ting et al. ..................... | 713/168 |
| 2007/0245152 | A1 * | 10/2007 | Pizano et al. ................. | 713/186 |
| 2008/0056494 | A1 * | 3/2008 | Jacobson et al. .............. | 380/255 |
| 2009/0064289 | A1 * | 3/2009 | Jang .................................. | 726/4 |

(Continued)

FOREIGN PATENT DOCUMENTS

JP  2003058503 A  *  2/2003
JP  2009093580 A  *  4/2009

OTHER PUBLICATIONS

"Kerberos (protocol)", Wikipedia, the free encyclopedia, retrieved date May 14, 2012, retrieved from Internet: http:en.wikipedia.org/w/index.php?title=Kerberos_(protocol)&printable=yes, 6pgs.

*Primary Examiner* — Andrew Nalven
*Assistant Examiner* — Walter Malinowski
(74) *Attorney, Agent, or Firm* — Buckley, Maschoff & Talwalkar LLC

(57) ABSTRACT

A system includes authentication of a user with a first server, reception of a request from the user to authenticate the user with a second server, requesting, from the first server, in response to receiving the request, user credentials to access the second server, reception of the user credentials from the first server, and transmission of the user credentials to the second server.

18 Claims, 7 Drawing Sheets

(56) References Cited

U.S. PATENT DOCUMENTS

| | | | |
|---|---|---|---|
| 2009/0132381 A1* | 5/2009 | Gangi | 705/18 |
| 2009/0271634 A1* | 10/2009 | Boult et al. | 713/186 |
| 2009/0276771 A1* | 11/2009 | Nickolov et al. | 717/177 |
| 2010/0070759 A1* | 3/2010 | Cobos et al. | 713/155 |
| 2010/0281102 A1* | 11/2010 | Chinta et al. | 709/203 |
| 2010/0293379 A1* | 11/2010 | Nie | 713/169 |
| 2011/0213966 A1* | 9/2011 | Fu et al. | 713/158 |
| 2011/0219229 A1* | 9/2011 | Cholas et al. | 713/168 |
| 2012/0102554 A1* | 4/2012 | Emerick et al. | 726/6 |
| 2012/0144464 A1* | 6/2012 | Fakhrai et al. | 726/6 |
| 2012/0204245 A1* | 8/2012 | Ting et al. | 726/6 |
| 2014/0189796 A1* | 7/2014 | Mashimo | 726/3 |

* cited by examiner

```
AP-REQ (Kerberos) [
        pvno: 5
        msg-type: 14
        ap-options: 00000000000000000000000000000000
        ticket: Ticket [
                tkt-vno: 5
                realm: SAP.CORP
                sname: [type: NT-PRINCIPAL, name: P4Kerberos]
                enc-part: EncryptedData [
                        etype: 23 (rc4-hmac)
                        kvno: 2
                        cipher: 0x982f46...edfc65
                        decrypted: [key: 0x99b87b...05c168, data: 0x638208...6164c8]
                        EncTicketPart [
                                flags: 01000000101000000000000000000000
                                key: [type: 23 (rc4-hmac), value: 0xdbe5ba...105bd9]
                                crealm: SAP.CORP
                                cname: [type: NT-PRINCIPAL, name: D051408]
                                authtime: 20110804075520Z
                                starttime: 20110804075829Z
                                endtime: 20110804175520Z
                                renew-till: 20110811075520Z
                        ]
                ]
        ]
        authenticator: EncryptedData [
                etype: 23 (rc4-hmac)
                kvno: 0cipher: 0x728dda...7b73dd
                decrypted: [key: 0xdbe5ba...105bd9, data: 0x6281b7...020117]
                Authenticator [
                        authenticator-vno: 5
                        crealm: SAP.CORP
                        cname: [type: NT-PRINCIPAL, name: D051408]
                        cksum: [type: 32771, value: 0x100000000000003c000000]
                        cusec: 7865
                        ctime: 20110804075919Z
                        subkey: [type: 23 (rc4-hmac), value: 0xd41817...b779ce]
                        seq-number: 1706426961
                ]
        ]
]
```

FIG. 4

SINGLE SIGN-ON FOR DISPARATE SERVERS

BACKGROUND

Computing infrastructures may provide client devices with access to several different server systems, each of which requires a separate user authentication.

BRIEF DESCRIPTION OF THE DRAWINGS

FIG. 4 illustrates user credentials according to some embodiments.

DETAILED DESCRIPTION

The following description is provided to enable any person in the art to make and use the described embodiments. Various modifications, however, will remain readily apparent to those in the art.

Figure 1:
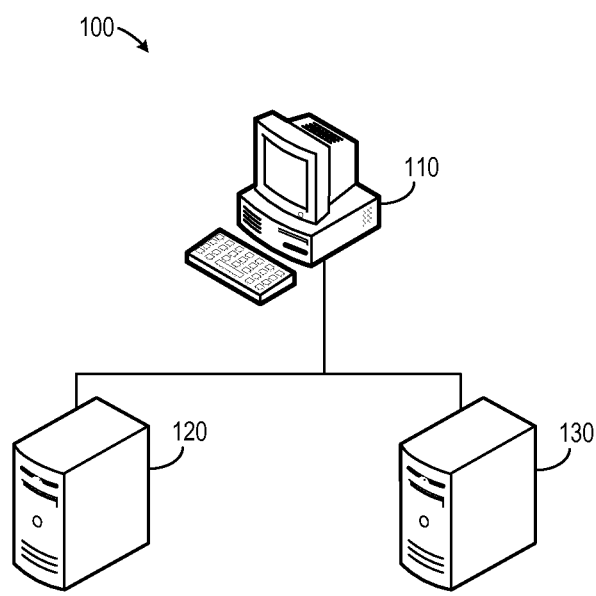
FIG. 1 is a block diagram of a computing architecture according to some embodiments.

FIG. 1 is a block diagram of computing architecture 100. Architecture 100 includes client computing system 110, server 120 and server 130. Any of the depicted elements of architecture 100 may be implemented by one or more hardware devices coupled via any number of public and/or private networks. Two or more of such devices may be located remote from one another all devices may communicate with one another via any known manner of network(s) and/or via a dedicated connection. Generally, physical implementations of computing architecture 100 are not limited by the FIG. 1 depictions.

Client system 110 may comprise a desktop computer, a laptop computer, a netbook computer, a tablet computer, a smartphone, and/or any other computing system that is or becomes known. Each of servers 120 and 130 provide functionality to one or more clients. According to some embodiments, each of servers 120 and 130 requires client system 110 to authenticate therewith before services are provided thereto.

Authentication may comprise any protocol for establishing a user's authorization to access a service. According to some embodiments, server 120 provides a user directory service (e.g., Active Directory) to provide client system 110 with access to a computing domain. Authentication in such an example may comprise transmitting a username and password from computing system 110 to server 120, and verifying the username and password at server 120.

Server 130 may also provide any service for which authentication is required. According to some embodiments, server 130 provides software versioning. Architecture 100 may therefore represent a portion of a network within a software development entity, with server 120 providing access to the entity's computer network and server 130 providing versioning functionality to software developers within the company.

Figure 2:
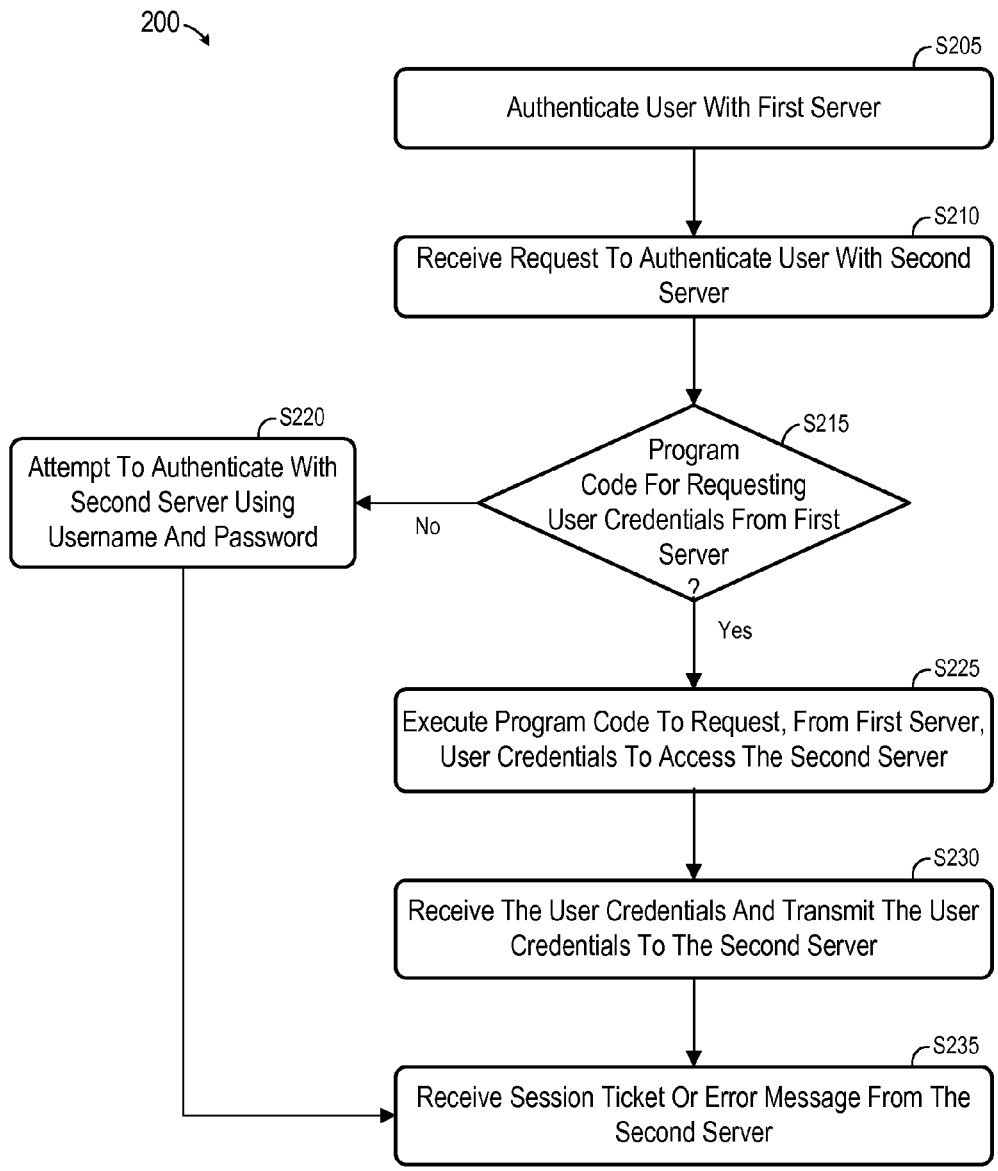
FIG. 2 is a flow diagram according to some embodiments.

FIG. 2 is a flow diagram of process 200 according to some embodiments. Process 200 and each other process described herein may be embodied in processor-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. Accordingly, a processor of any suitable device or devices (e.g., client system 110) may execute the program code to cause the device or devices to operate as described. In some embodiments, hard-wired circuitry may be used in place of, or in combination with, program code for implementation of processes according to some embodiments. Embodiments are therefore not limited to any specific combination of hardware and software.

Initially, a user is authenticated with a first server at S205. The first server may provide any service for which user authentication is required. The authentication at S205 may proceed according to any authentication protocol that is or becomes known. According to some embodiments, the user operates a computing device to transmit a username and password to the first server at S205. In a particular example, the computing device is a Win32 executable device, the first server is an Active Directory server, and the authentication is based on username/password.

Next, at S210, a request is received to authenticate the user with a second server. The second server may provide any type of service to client devices, such as software versioning. The request received at S210 may comprise a command entered into the client device by the user to login to the second server.

It is then determined at S215 whether the client device includes program code for requesting user credentials for the second server from the first server. According to some embodiments, S215 comprises determining whether an environment variable has been set on the client device to point to a script for requesting the user credentials from the first server. If no such program code is available, the user id prompted at S220 to authenticate with the second server via username/password, or by whatever authentication protocol is required by the second server. A session ticket or an error message is then received from the second server at S235 depending on whether the authentication is successful.

Figure 3:
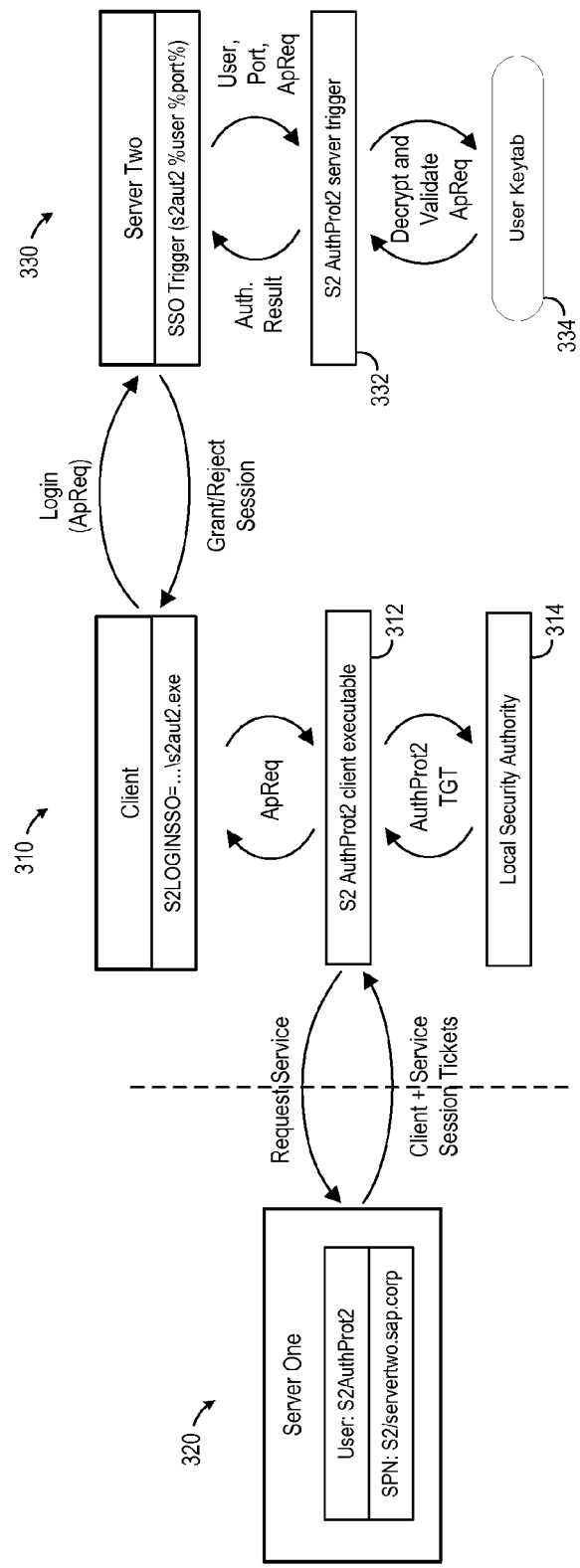
FIG. 3 is a block diagram illustrating operation according to some embodiments.

FIG. 3 is a diagram illustrating operation of process 200 according to some embodiments. Each block of FIG. 3 may be implemented by any combination of hardware and/or processor-executable software.

As shown, client 310 includes environmental variable "S2LOGINSSO" which points to executable script 312. Accordingly, the determination at S215 is positive, and the script is executed at S225 to request, from server 320, user credentials to access second server 330.

According to the illustrated embodiment, authentication to server 330 corresponds to the Kerberos authentication protocol. Accordingly, a Kerberos Ticket Granting Ticket is already located in local security authority 314. Moreover, Service Principal (SPN) has been created within server 320 and associated with the username "S2AuthProt2" and a static password.

Executable 312 uses the Ticket Granting Ticket to request the user credentials from server 320. Since the user has already been authenticated to server 320, no authentication to server 320 is needed. In response, server 320 initializes a session and creates appropriate user credentials. According to some embodiments, the user credentials include a ticket for requesting the service of server 330 within a Kerberos Application Request structure. The ticket is encrypted with the SPN password and contains an authenticator node identifying the user. The authenticator node is encrypted with a session key issued by server 320, which may be valid for a limited period of time. FIG. 4 illustrates an example of a decrypted Application Request according to some embodiments.

The client device receives the user credentials from the first server and transmits the user credentials to the second server at S230. According to some embodiments, the user credentials comprise a string with a max length of 128K. The string may be encoded as a Base64 string.

Win32 Kerberos libraries do not support channel bindings. Accordingly, in some embodiments, the target server port is attached to the encrypted Application Request received from the first server and is encrypted with the session key. The output from the executable may therefore consist of a Base64-encoded Application Request, a predefined delimiter (e.g., '@'), and an additional Base64-encoded string identifying the target server port. If the client device runs Linux, the target port information is included as Channel Binding in the encrypted Application Request.

After transmission of the user credentials, a session ticket or an error message is received from the second server at S235 depending on whether the user credentials are verified thereby.

Figure 5:
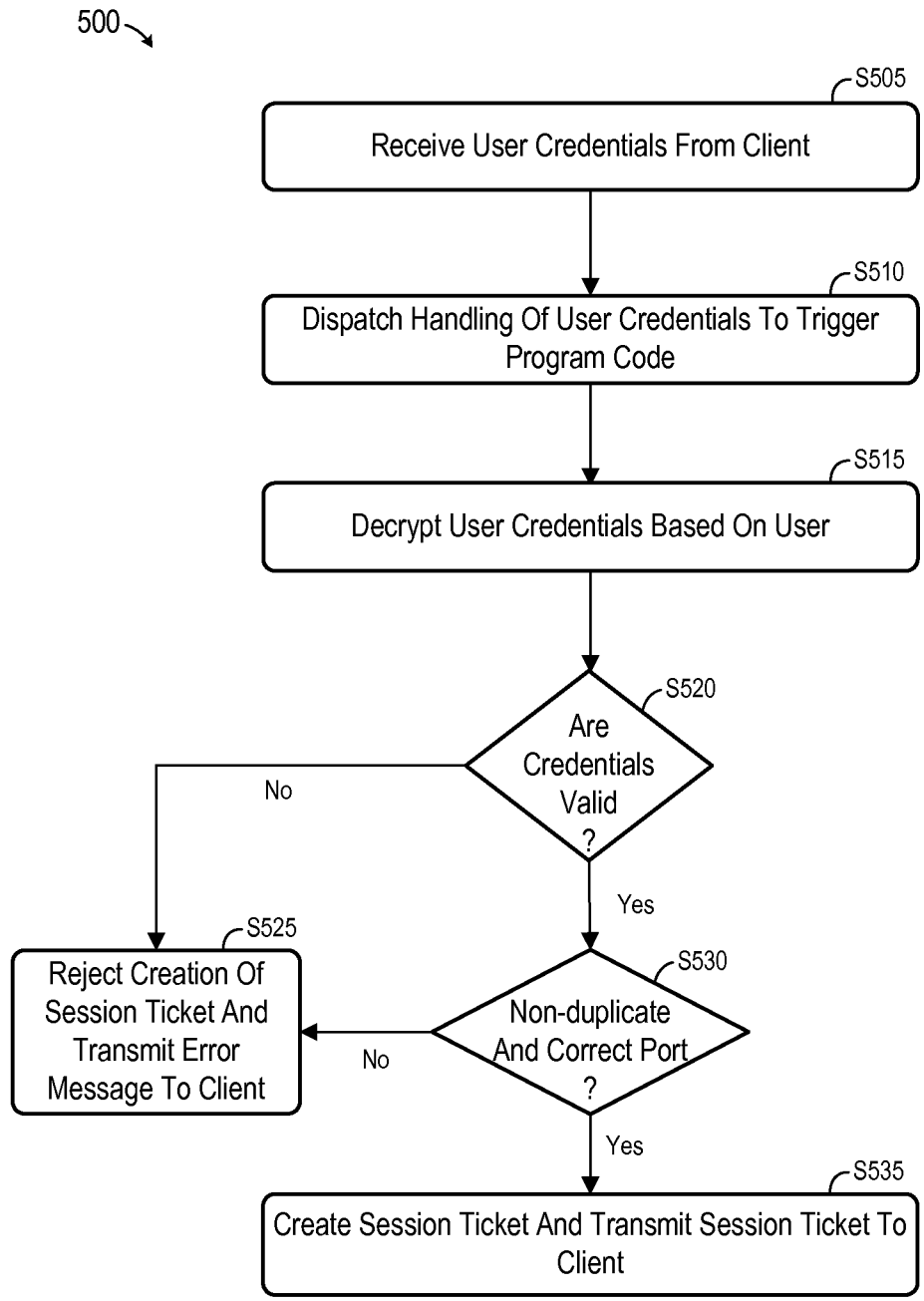
FIG. 5 is a block diagram illustrating according to some embodiments.

FIG. 5 is a flow diagram of a process executed upon receipt of user credentials from a client device. Accordingly, process 500 may be executed by server 330 between S230 and S235 of process 200.

In this regard, user credentials are received from a client at S505. The user credentials may comprise an Application Request as described above. Server 330 includes a facility to dispatch handling of received user credentials, such as an Application Request, to an executable trigger. Accordingly, the user credentials are dispatched to trigger 332 at S510. The message including the user credentials may also specify the identity of the user transmitting the request and a receiving port of server 330 (i.e., channel binding).

The user credentials are decrypted at S515 using keytab file 334 stored on server 330. Keytab file 334 includes the SPN password, which may be encrypted with various cryptography methods (e.g., rc4-hmac). A sample keytab file is shown below:

[1] principal: S2AuthProt2@SAP.CORP
  key: [type: 3, value: 0x73a23b . . . 087f1f]
[2] principal: S2AuthProt2@SAP.CORP
  key: [type: 1, value: 0x73a23b . . . 087f1f]
[3] principal: S2AuthProt2@SAP.CORP
  key: [type: 23, value: 0x99687 . . . 05c168]
[4] principal: S2AuthProt2@SAP.CORP
  key: [type: 16, value: 0xe0134 . . . 762fdc]
[5] principal: S2AuthProt2@SAP.CORP
  key: [type: 17, value: 0x64d98 . . . a03b46]

Once the user credentials (e.g., the ticket) are decrypted using the keytab file, the authenticator node therein may be decrypted based on the session key within the ticket.

Validity of the user credentials is determined at S520. The determination at S520 may include determining whether the decryption at S515 was successful, confirming that the user specified in the authenticator node is the same user from which the credentials were received, evaluating a time stamp of the credentials (e.g., were credentials created within previous five minutes), evaluating a checksum, evaluating a format of the user credentials, etc. If the user credentials are determined to be invalid, no session ticket is created and an error message is transmitted to the client at S525.

If the credentials are determined to be valid, flow proceeds to S530 to determine whether the request is a duplicate and is received at the correct port of the second server. In some embodiments, the second server may be a cluster including several server nodes, each of which runs on its own workstation and operating system. In such embodiments, the correct "port" is a particular server node of the cluster.

Figure 6:
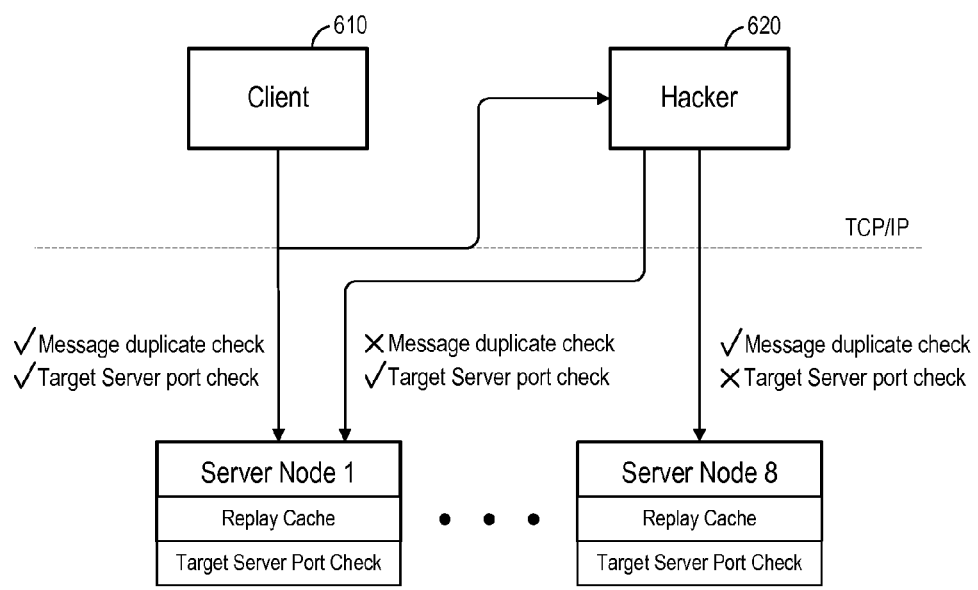
FIG. 6 is a diagram illustrating message verification according to some embodiments.

FIG. 6 illustrates the determination at S530 according to some embodiments. As shown, server 330 is a cluster including several server nodes. Each server node includes a dedicated replay cache for recording previously-received messages. Accordingly, if hacker 620 "sniffs" a message sent by client 610 to server node 1 and resends that message to server node 8, server node 8 would not be able to determine that the message is a duplicate because the replay cache of server node 8 would not contain a record of that message. Rather, only the replay cache of server node 1 would contain a record of the message.

Accordingly, to assure that hacker 620 cannot exploit this feature, a server node checks both the target port of the received message and its own replay cache. In the latter regard, each message (e.g., Application Request) may specify a sequence number that is recorded in the replay cache of the server node at which the message is received. Therefore, S530 may comprise determining whether the sequence number of the received message exists in the replay cache of the server node which has received the message, and whether the specified target port is a port associated with the server node.

If the determination at S530 is negative, flow proceeds to S525 as described above to transmit an error message to the client. If not, a session ticket is created and transmitted to the client at S535. Authentication with the second server is therefore successful, without requiring the user to perform a second sign-on according to some embodiments.

Figure 7:
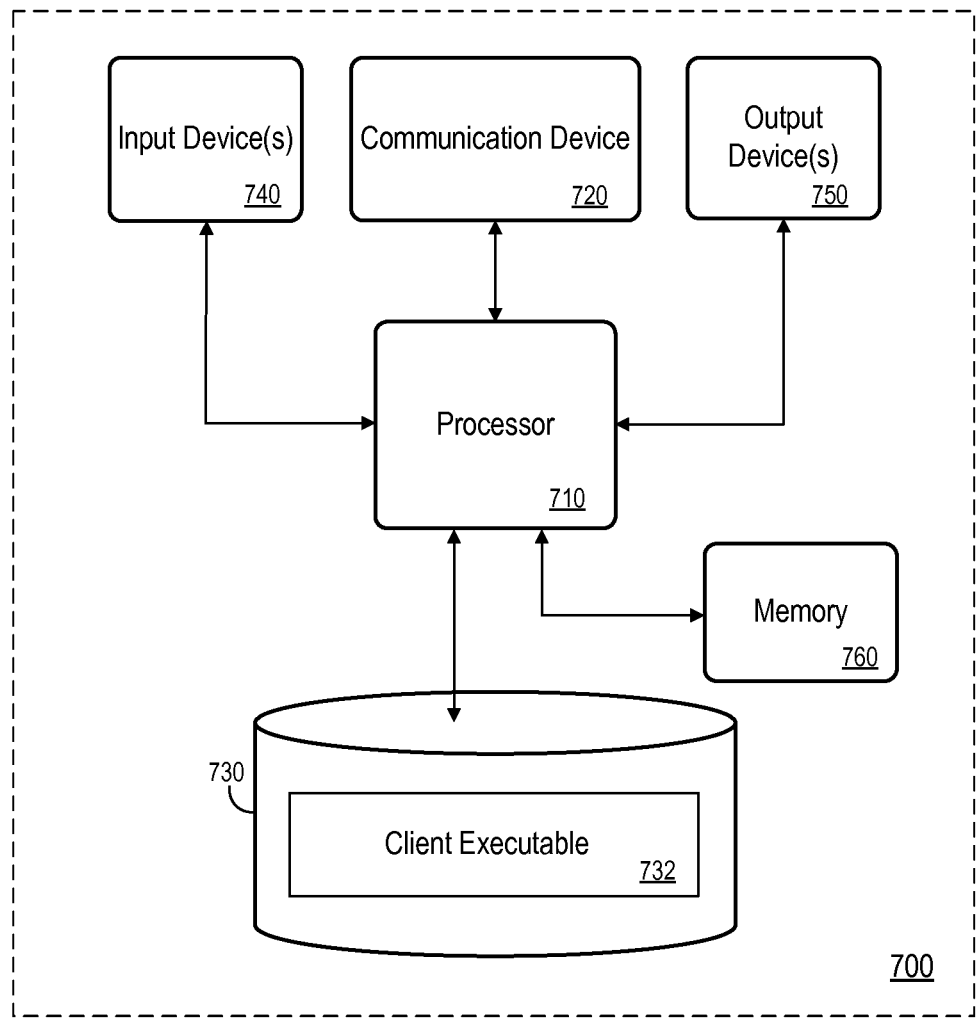
FIG. 7 is a block diagram of a hardware system according to some embodiments.

FIG. 7 is a block diagram of apparatus 700 according to some embodiments. Apparatus 700 illustrates one hardware architecture implementing a client device as described above, but implementations of client devices are not limited thereto. Elements of apparatus 700 may therefore operate to execute methods as described above. Apparatus 700 may include other unshown elements according to some embodiments.

Apparatus 700 includes processor 710 operatively coupled to communication device 720, data storage device 730, one or more input devices 740, one or more output devices 750 and memory 760. Communication device 720 may facilitate communication with external devices, such as via a computer network. Input device(s) 740 may comprise, for example, a keyboard, a keypad, a mouse or other pointing device, a microphone, knob or a switch, an infra-red (IR) port, a docking station, and/or a touch screen. Input device(s) 740 may be used, for example, to enter information into apparatus 700. Output device(s) 750 may comprise, for example, a display (e.g., a display screen) a speaker, and/or a printer.

Data storage device 730 may comprise any appropriate persistent non-transitory storage media, including combinations of magnetic storage devices (e.g., magnetic tape, hard disk drives and flash memory), optical storage devices, Read Only Memory (ROM) devices, etc., while memory 760 may comprise Random Access Memory (RAM).

Client executable 732 of data storage device 730 may comprise program code executable by processor 710 to provide any of the functions described herein, including but not limited to process 200. Embodiments are not limited to execution of these functions by a single apparatus. Data storage device 730 may also store data and other program code for providing additional functionality and/or which are necessary for operation thereof, such as device drivers, operating system files, etc.

Apparatus 700 may also or alternatively comprise an implementation of a first server or a second server as described above. Such an apparatus would include program code executable to cause the apparatus to perform the functions described above with respect to a first server or a second server.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:
   authenticating a user with a first server;
   receiving a request from the user to authenticate the user with a second server;
   in response to receiving the request, determining, by a client device, whether the client device includes program code for requesting user credentials for the second server from the first server;
   if it is determined, by the client device, that the client device includes program code for requesting user credentials for the second server from the first server, requesting, from the first server, user credentials to access the second server;
   receiving the user credentials from the first server; and
   transmitting the user credentials to the second server;
   wherein the received user credentials comprise a ticket encrypted with a password, the ticket comprising a node encrypted with a session key;
   the method further comprising;
      receiving the user credentials at the second server;
      decrypting the ticket at the second server using the password;
      verifying, at the second server, that decrypted ticket is valid;
      decrypting the node using the session key at the second server;
      verifying the user identity based on the decrypted node;
      transmitting a session ticket in response to verifying the user identity; and
      prior to transmitting the session ticket, verifying that the user credentials are received by a correct port of the second server and determining that a sequence number of the user credentials has not been previously received by the second server.

2. A method according to claim 1, wherein the first server comprises an Active Directory server.

3. A method according to claim 1, wherein requesting the user credentials to access the second server from the first server comprises:
   retrieving a Ticket Granting Ticket associated with the user from a local memory; and
   transmitting the Ticket Granting Ticket to the first server; and
   wherein the received user credentials comprise a Kerberos Application Request structure.

4. A non-transitory medium storing computer-executable program code, the program code executable by a computing device to:
   authenticate a user with a first server;
   receive a request from the user to authenticate the user with a second server;
   in response to receiving the request, determine, by a client device, whether the client device includes program code for requesting user credentials for the second server from the first server;
   if it is determined, by the client device, that the client device includes program code for requesting user credentials for the second server from the first server, request from the first server, user credentials to access the second server;
   receive the user credentials from the first server; and
   transmit the user credentials to the second server;
   wherein the received user credentials comprise a ticket encrypted with a password, the ticket comprising a node encrypted with a session key;
   the program code further executable by the second server to:
      receive the user credentials;
      decrypt the ticket using the password;
      verify that decrypted ticket is valid;
      decrypt the node using the session key;
      verify the user identity based on the decrypted node;
      transmit a session ticket to the computing system in response to verifying the user identity; and
      prior to transmission of the session ticket, verify that the user credentials are received by a correct port of the second server and determine that a sequence number of the user credentials has not been previously received by the second server.

5. A medium according to claim 4, wherein requesting of the user credentials to access the second server from the first server comprises:
   retrieval of a Ticket Granting Ticket associated with the user from a local memory; and
   transmission of the Ticket Granting Ticket to the first server; and
   wherein the received user credentials comprise a Kerberos Application Request structure.

6. A medium according to claim 4, wherein the first server comprises an Active Directory server.

7. A system comprising:
   a first server comprising a first processor and a first memory;
   a second server comprising a second processor and a second memory;
   a client system comprising a third processor and a third memory, the third processor to execute program code stored in the third memory to:
   authenticate a user with the first server;
   receive a request from the user to authenticate the user with the second server;
   in response to receiving the request, determine, by a client device, whether the client device includes program code for requesting user credentials for the second server from the first server;
   if it is determined, by the client device, that the client device includes program code for requesting user credentials for the second server from the first server, request from the first server, user credentials to access the second server;
   receive the user credentials from the first server; and
   transmit the user credentials to the second server;
   wherein the received user credentials comprise a ticket encrypted with a password, the ticket comprising a node encrypted with a session key; and
   wherein the second processor is to execute program code stored in the second memory to:
   receive the user credentials;

decrypt the ticket using the password;
verify that decrypted ticket is valid;
decrypt the node using the session key;
verify the user identity based on the decrypted node; and
transmit a session ticket to the computing system in response to verifying the user identity;
verify, prior to transmission of the session ticket, that the user credentials are received by a correct port of the second server and determine that a sequence number of the user credentials has not been previously received by the second server.

8. A system according to claim 7, wherein requesting of the user credentials to access the second server from the first server comprises:
retrieval of a Ticket Granting Ticket associated with the user from a local memory; and
transmission of the Ticket Granting Ticket to the first server; and
wherein the received user credentials comprise a Kerberos Application Request structure.

9. A system according to claim 7, wherein the first server comprises an Active Directory server.

10. A method implemented by a computing system in response to execution of program code by a processor of the computing system, the method comprising:
authenticating a user with a first server;
receiving a request from the user to authenticate the user with a second server;
in response to receiving the request, requesting, from the first server, user credentials to access the second server;
receiving the user credentials from the first server; and
transmitting the user credentials to the second server;
wherein the received user credentials comprise a ticket encrypted with a password, the ticket comprising a node encrypted with a session key;
the method further comprising:
receiving the user credentials at the second server;
decrypting the ticket at the second server using the password;
verifying, at the second server, that decrypted ticket is valid;
decrypting the node using the session key at the second server;
verifying the user identity based on the decrypted node;
transmitting a session ticket in response to verifying the user identity; and
prior to transmitting the session ticket, verifying that the user credentials are received by a correct port of the second server and determining that a sequence number of the user credentials has not been previously received by the second server.

11. A method according to claim 10, wherein the first server comprises an Active Directory server.

12. A method according to claim 10, wherein requesting the user credentials to access the second server from the first server comprises:
retrieving a Ticket Granting Ticket associated with the user from a local memory; and
transmitting the Ticket Granting Ticket to the first server; and
wherein the received user credentials comprise a Kerberos Application Request structure.

13. A non-transitory medium storing computer-executable program code, the program code executable by a computing device to:
authenticate a user with a first server;
receive a request from the user to authenticate the user with a second server;
request from the first server, in response to receiving the request, user credentials to access the second server;
receive the user credentials from the first server; and
transmit the user credentials to the second server;
wherein the received user credentials comprise a ticket encrypted with a password, the ticket comprising a node encrypted with a session key;
the program code further executable by the second server to:
receive the user credentials;
decrypt the ticket using the password;
verify that decrypted ticket is valid;
decrypt the node using the session key;
verify the user identity based on the decrypted node; and
transmit a session ticket to the computing system in response to verifying the user identity; and
prior to transmission of the session ticket, verify that the user credentials are received by a correct port of the second server and determine that a sequence number of the user credentials has not been previously received by the second server.

14. A medium according to claim 13, wherein requesting of the user credentials to access the second server from the first server comprises:
retrieval of a Ticket Granting Ticket associated with the user from a local memory; and
transmission of the Ticket Granting Ticket to the first server; and
wherein the received user credentials comprise a Kerberos Application Request structure.

15. A medium according to claim 13, wherein the first server comprises an Active Directory server.

16. A system comprising:
a first server comprising a first processor and a first memory;
a second server comprising a second processor and a second memory;
a client system comprising a third processor and a third memory, the third processor to execute program code stored in the third memory to:
authenticate a user with the first server;
receive a request from the user to authenticate the user with the second server;
request from the first server, in response to receiving the request, user credentials to access the second server;
receive the user credentials from the first server; and
transmit the user credentials to the second server;
wherein the received user credentials comprise a ticket encrypted with a password, the ticket comprising a node encrypted with a session key, and
wherein the second processor is to execute program code stored in the second memory to:
receive the user credentials;
decrypt the ticket using the password;
verify that decrypted ticket is valid;
decrypt the node using the session key;
verify the user identity based on the decrypted node;
transmit a session ticket to the computing system in response to verifying the user identity; and
verify, prior to transmission of the session ticket, that the user credentials are received by a correct port of the second server and determine that a sequence number of the user credentials has not been previously received by the second server.

17. A system according to claim 16, wherein requesting of the user credentials to access the second server from the first server comprises:
  retrieval of a Ticket Granting Ticket associated with the user from a local memory; and
  transmission of the Ticket Granting Ticket to the first server; and
  wherein the received user credentials comprise a Kerberos Application Request structure.

18. A system according to claim 16, wherein the first server comprises an Active Directory server.

\* \* \* \* \*